(12) United States Patent
Tale' et al.

(10) Patent No.: US 6,269,931 B1
(45) Date of Patent: Aug. 7, 2001

(54) DEVICE FOR FORMING GROUPS OF CIGARETTES

(75) Inventors: Fabrizio Tale', Bologna; Marco Brizzi, Zola Predosa; Mario Spatafora, Bologna, all of (IT)

(73) Assignee: G.D. Societa' per Azioni, Bologna (IT)

( * ) Notice: Subject to any disclaimer, the term of this patent is extended or adjusted under 35 U.S.C. 154(b) by 0 days.

(21) Appl. No.: 09/470,634

(22) Filed: Dec. 22, 1999

(30) Foreign Application Priority Data

Dec. 22, 1998 (IT) .............................. BO98A0708

(51) Int. Cl.$^7$ .................................. B65G 47/30
(52) U.S. Cl. ............................ 198/418.3; 53/151
(58) Field of Search ............... 198/418.1, 418.2, 198/418.3, 424; 53/444, 148, 150, 151

(56) References Cited

U.S. PATENT DOCUMENTS

| | | |
|---|---|---|
| 3,435,940 * | 4/1969 | Seragnoli ........................... 198/418.3 |
| 4,306,648 * | 12/1981 | Manservisi et al. .............. 198/418.3 |
| 4,341,298 * | 7/1982 | Dingli ............................... 198/418.3 |
| 4,607,475 | 8/1986 | Manservisi et al. .................... 53/150 |
| 4,700,825 * | 10/1987 | Mattei et al. ...................... 198/418.3 |
| 5,070,991 * | 12/1991 | Hinchcliffe et al. ............. 198/429 X |
| 5,548,941 * | 8/1996 | Portaro et al. ................. 198/418.1 X |
| 5,699,896 * | 12/1997 | Spada et al. .................. 198/418.3 X |

* cited by examiner

*Primary Examiner*—James R. Bidwell
(74) *Attorney, Agent, or Firm*—Marshall, O'Toole, Gerstein, Murray & Borun

(57) ABSTRACT

A device for forming groups of cigarettes having a number of superimposed layers, whereby each layer is expelled by a movable push member from a respective outlet of a hopper having a number of outlets, and is fed into a respective movable pocket for receiving, a respective group of cigarettes; and each outlet has an intercepting member movable to and from a work position closing the outlet, and defined by a rigid plate connectable to the respective movable push member to move to and from the closed work position.

7 Claims, 4 Drawing Sheets

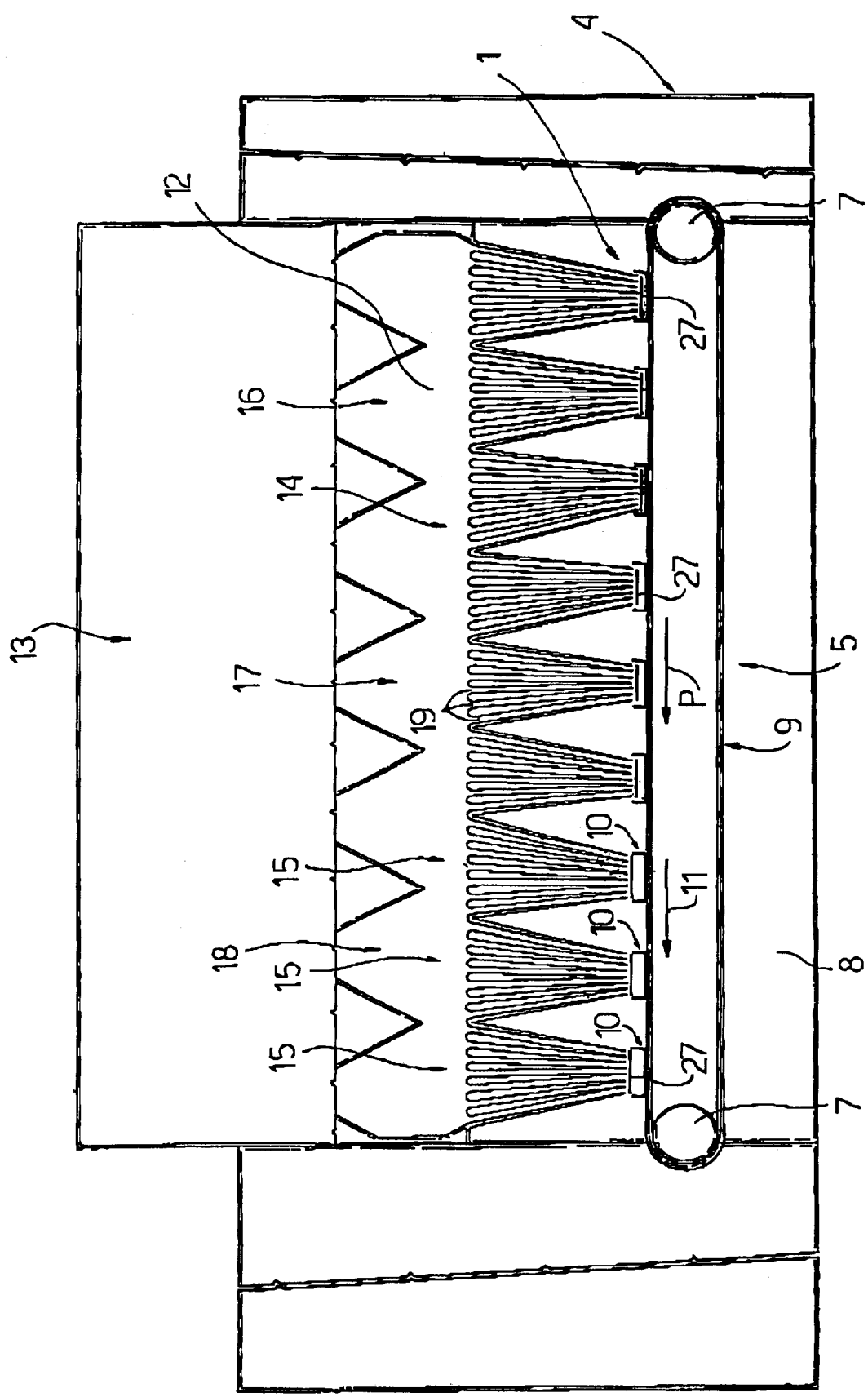

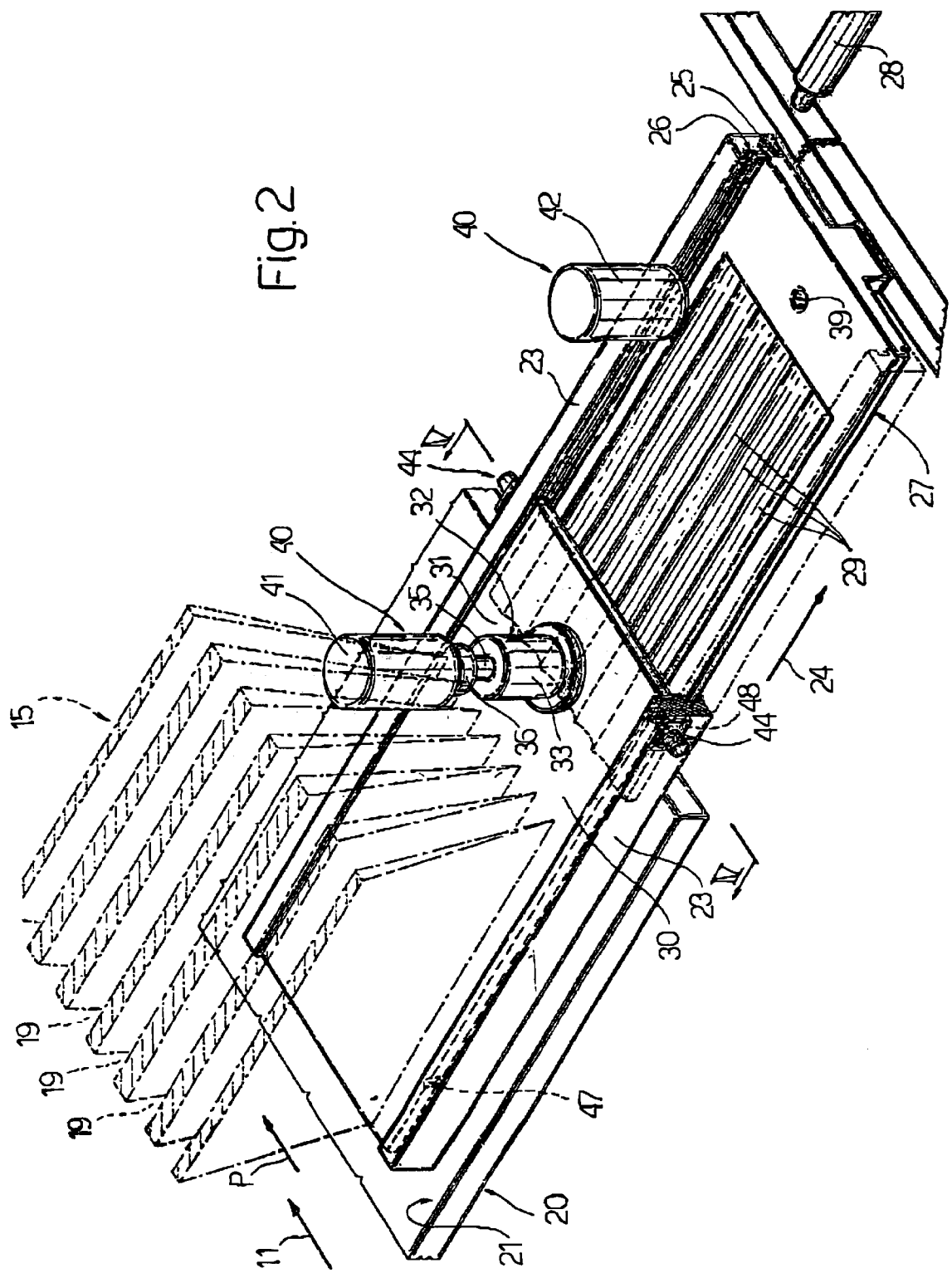

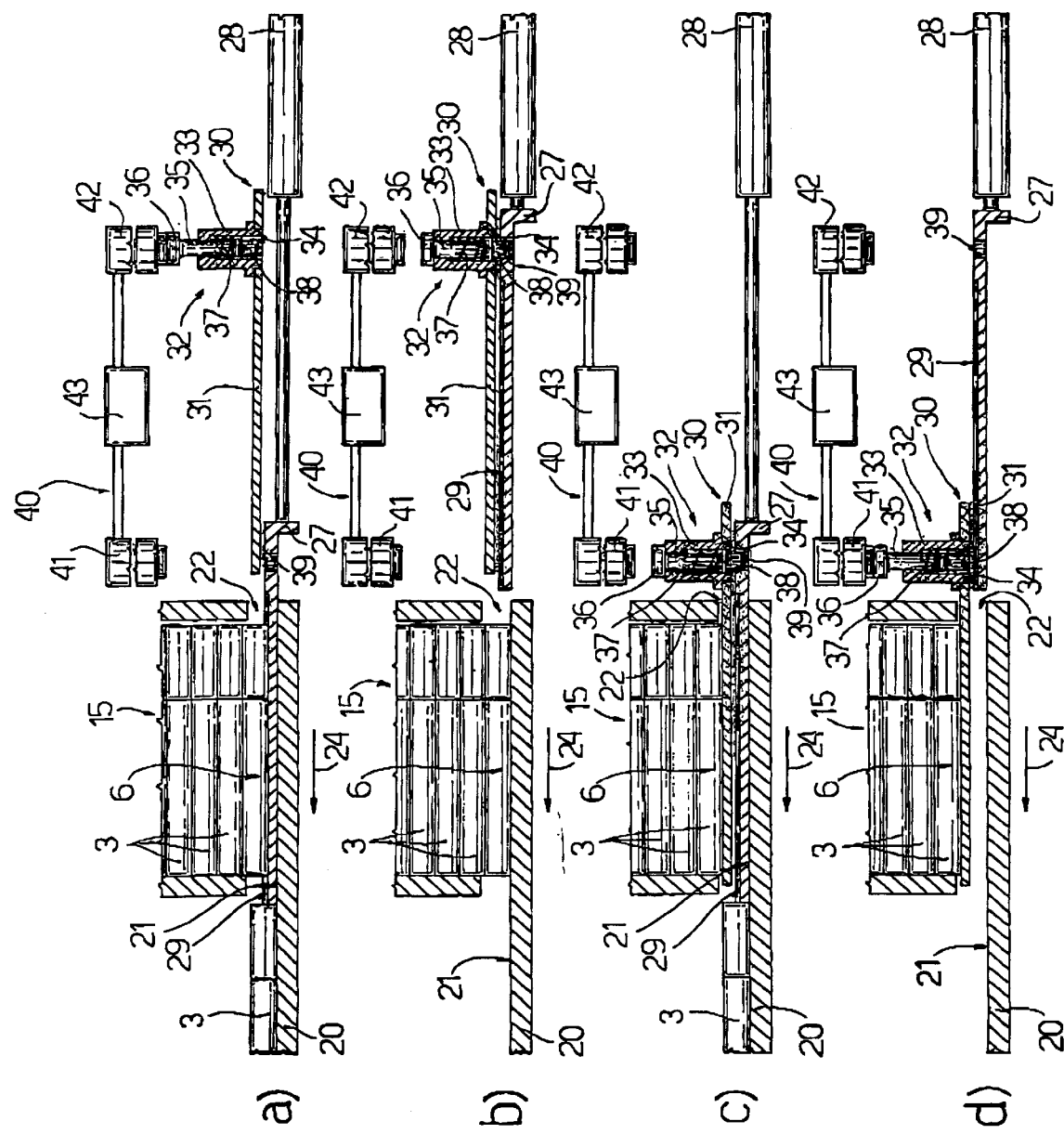

DEVICE FOR FORMING GROUPS OF CIGARETTES

The present invention relates to a device for forming groups of cigarettes.

BACKGROUND OF THE INVENTION

On cigarette packing machines, groups of cigarettes, each defining the content of a packet of cigarettes, are fed successively to a packing line by means of a step-operated supply device comprising a number of pockets equally spaced along the device and each for housing a respective group of cigarettes.

The cigarettes are fed to the supply device by means of a hopper having an output end divided into a number of outlets normally equal to the number of layers defining each group of cigarettes. As each group of cigarettes normally comprises three layers, the hopper normally comprises three outlets, each of which is divided into a number of substantially vertical channels equal to the number of cigarettes in the respective layer.

In the above case, the supply device is fed forward in steps so that, at each stop, three pockets are positioned at the three outlets beneath the output end of the hopper. The output end of the hopper comprises three push members located at increasing levels and activated simultaneously to transfer, at each stop of the supply device, a layer of cigarettes into each of the three pockets facing the push members. Consequently, each step of the supply device corresponds to the formation of one complete group of cigarettes comprising three superimposed layers and housed inside the pocket emerging from beneath the hopper at that particular step.

Though highly efficient, a major drawback of the above known forming device is the formation, when the device is started up and stopped, of incomplete groups of cigarettes which must therefore be rejected.

That is, when the forming device is started up, the three push members, which are activated simultaneously, are positioned facing respective empty pockets, so that, while the first push member may safely feed a respective bottom layer into the facing pocket, the second push member feeds an intermediate layer into a pocket with no bottom layer, and the third push member feeds a top layer into a pocket with no bottom or intermediate layer. Similarly, when the push members are stopped simultaneously, the first and the second group fed out of the hopper by the supply device have, respectively, no top layer and no intermediate or top layer.

The above drawback is at least partly eliminated by U.S. Pat. No. 4,607,475, in which each hopper outlet is assigned a respective intercepting member for intercepting and cutting off supply of the cigarettes to the respective outlet, and which is activated independently of the respective push member. Each intercepting member comprises a flexible diaphragm movable between a rest position, in which the diaphragm is wound about a respective winding roller to the side of the respective outlet, and a work position in which, by means of an electric motor, the diaphragm is unwound off the respective roller and inserted inside a straight guide between the respective push member and respective outlet.

An intercepting member of the above type has serious drawbacks, both technically and in terms of cost.

Firstly, the electric motor for activating the intercepting member complicates the structure of the member itself and increases the overall cost of the forming device, particularly in the case of a hopper with more than three outlets and, hence, more than three intercepting members.

Secondly, being flexible, the intercepting member is subject to jamming when switching from the rest position, in which the flexible diaphragm is curved by being wound about the respective roller, to the work position in which the diaphragm is laid flat along the respective straight guide.

SUMMARY OF THE INVENTION

It is an object of the present invention to provide a device for forming groups of cigarettes, designed to eliminate the aforementioned drawbacks.

According to the present invention, there is provided a forming device for forming groups of cigarettes, each comprising a number of superimposed layers of cigarettes, the forming device comprising a hopper for supplying cigarettes and in turn having groups of outlets equal in number to said layers, said outlets being equally spaced along a supply path; a supply device having a number of pockets spaced along said supply path in the same way as said outlets and each for housing a respective said group of cigarettes; a movable push member for expelling a respective said layer of cigarettes from a respective said outlet and transferring said layer to a said pocket; and an intercepting member movable to and from a work position in which the intercepting member is located beneath a respective said outlet;, the forming device being characterized in that each intercepting member comprises a rigid plate connectable to the respective movable push member so as to move, with the movable push member, to and from said work position.

BRIEF DESCRIPTION OF THE DRAWINGS

A non-limiting embodiment of the invention will be described by way of example with reference to the accompanying drawings, in which:

FIG. 1 shows a schematic front view, with parts removed for clarity, of a preferred embodiment of the forming device according to the present invention;

FIG. 2 shows a larger-scale, partially sectioned view in perspective of a detail in FIG. 1;

FIG. 5 shows the FIG. 2 detail in successive operating positions.

DETAILED DESCRIPTION OF THE INVENTION

Figure 3:
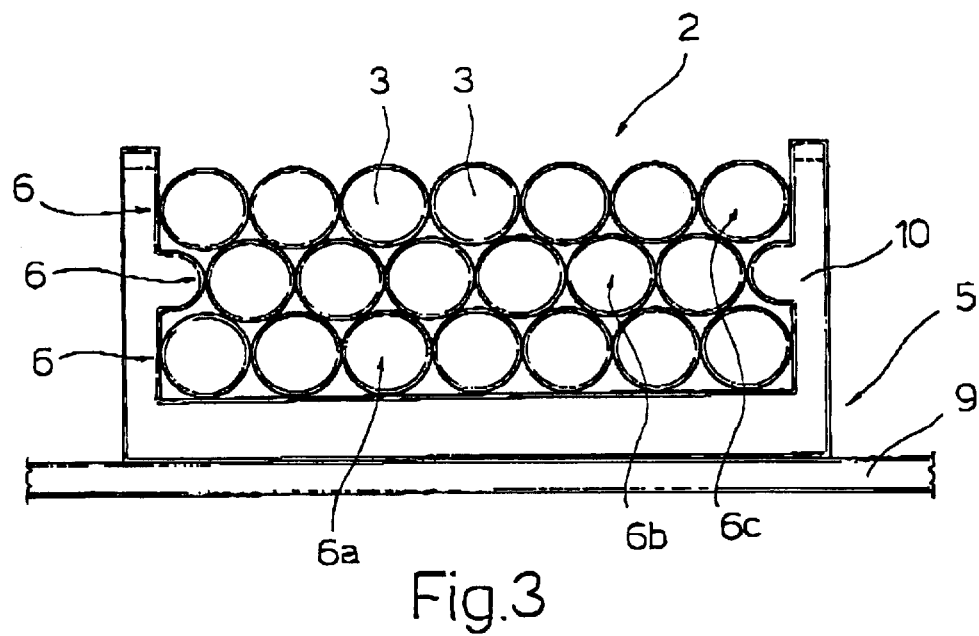
FIG. 3 shows a larger-scale view of a further detail in FIG. 1.

Number 1 in FIG. 1 indicates as a whole a forming device for forming groups 2 (FIG. 3) of cigarettes 3 on a cigarette packing machine 4. Forming device 1 comprises a supply device 5 for feeding a succession of groups 2 to a wrapping line (not shown) of packing machine 4. Each group 2 forms the content of a packet (not shown) of cigarettes, and is defined by a number of superimposed layers of cigarettes 3. More specifically, in the FIG. 3 embodiment, each group 2 comprises three superimposed layers 6 indicated 6a, 6b and 6c.

Supply device 5 comprises two pulleys 7—one of which is powered—fitted to a fixed frame 8 to rotate in steps about respective axes parallel to each other and perpendicular to the FIG. 1 plane. Device 5 also comprises a conveyor belt 9 looped about pulleys 7 and having a number of pockets 10 equally spaced along belt 9 and each for receiving a respective group 2. In the FIG. 1 embodiment, pulleys 7 are rotated anticlockwise, and pockets 10 on the top conveying branch of belt 9 are fed in a substantially horizontal direction 11 along a supply path P.

Forming device 1 also comprises a hopper 12 located above, and set back with respect to, device 5, and which defines the end portion of a supply unit 13 for supplying cigarettes 3. Hopper 12 comprises an output end 14 having nine outlets 15 divided into three groups 16, 17, 18 located successively in direction 11 and each comprising three outlets 15. At each stop of belt 9, each outlet 15 is positioned facing a respective pocket 10.

In alternative embodiments not shown, hopper 12 comprises a number of outlets 15 equal to three or any multiple of three.

At each stop of belt 9, each of the three outlets 15 in group 16 feeds a bottom layer 6a of cigarettes 3 into a respective pocket 10: each of the three outlets 15 in group 17 feeds an intermediate layer 6b of cigarettes 3 into a respective pocket 10; and each of the three outlets 15 in group 18 feeds a top layer 6c of cigarettes 3 into a respective pocket 10.

Each outlet 15 is divided by substantially vertical partitions into a number of channels 19 equal to the number of cigarettes 3 in respective layer 6, and along which cigarettes 3 are fed in a direction substantially crosswise to their respective longitudinal axes.

Figure 4:
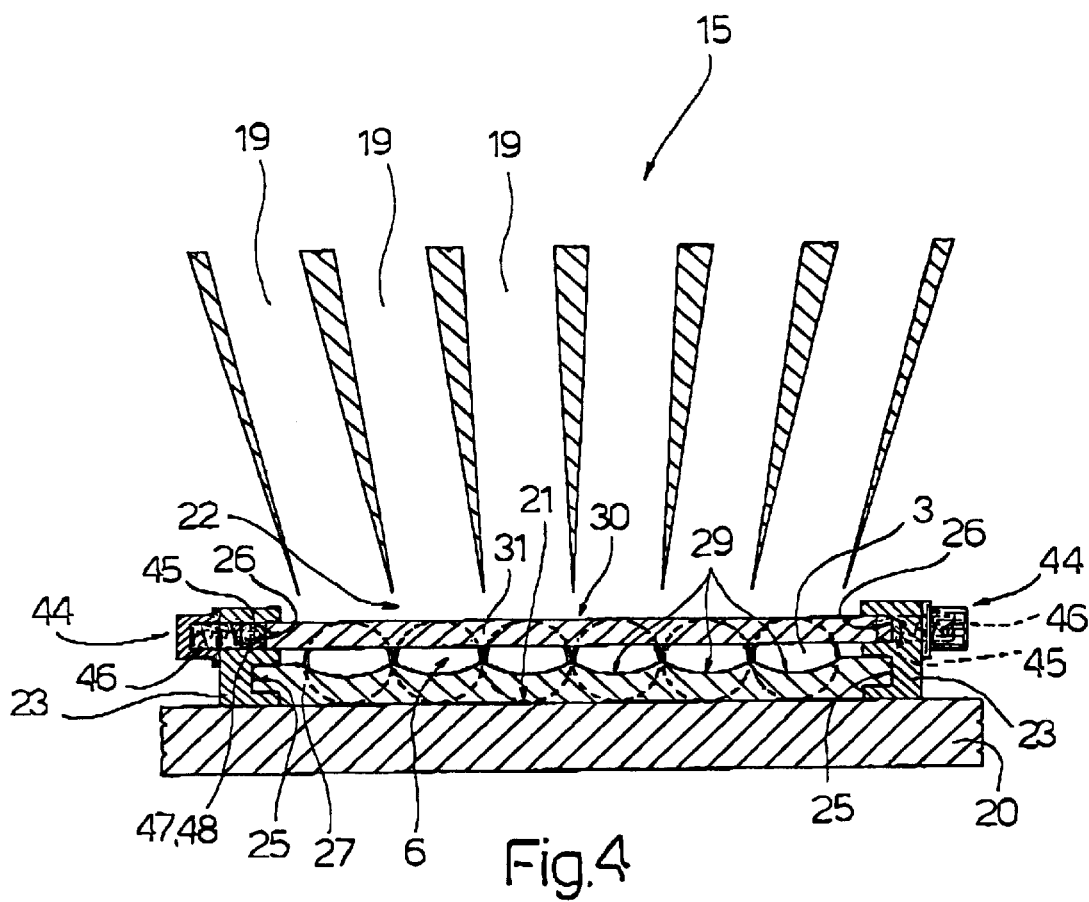
FIG. 4 shows a section, with parts removed for clarity, along line IV—IV in FIG. 2.

With reference to FIGS. 2 and 4, all the channels 19 in each group 16–18 are defined at the bottom by a common fixed horizontal plate 20 for supporting the cigarettes 3 fed along channels 19 of respective group 16–18. The top surfaces 21 of plates 20 are located at increasing levels, with a difference in level one from the other substantially equal to the diameter of a cigarette 3, and define, together with respective outlets 15, respective horizontal gaps 22 of a height approximately equal to but no smaller than the diameter of a cigarette 3 (FIG. 4). It should be pointed out that surface 21 of plate 20 of group 16 is coplanar with the bottom wall of pockets 10.

Each outlet 15 has a respective pair of parallel guides 23, which are located on opposite sides of outlet 15 in direction 11, extend parallel to a horizontal direction 24 crosswise to direction 11, are connected integrally to respective plate 20, and project from the edge of plate 20 opposite the edge facing belt 9. Each guide 23 comprises a bottom longitudinal groove 25 and a top longitudinal groove 26, which extend parallel to, direction 24 and are formed along the edge of guide 23 facing the other guide 23.

The two grooves 25 house in sliding manner a push member 27, which is defined by a substantially rectangular plate—two opposite longitudinal edges of which are engaged in sliding manner inside respective grooves 25—and is movable—by an actuating cylinder 28 normally common to all of push members 27, which are thus activated simultaneously—between a rest position (FIGS. 5b and 5d) in which member 27 is located substantially outside respective gap 22, and a work position (FIGS. 5a and 5c) in which member 27 is located inside respective gap 22. The top surface of member 27 has a number of grooves 29 parallel to direction 24, equal to the number of channels 19 of respective outlet 15, and which, when member 27 is in the work position, are positioned facing the outputs of respective channels 19 so as each to receive a respective cigarette 3.

The two grooves 26 in guides 23 of each outlet 15 house in sliding manner an intercepting member 30 comprising a substantially rectangular plate 31, the opposite longitudinal edges of which engage respective grooves 26 in sliding manner. Member 30 also comprises a connecting device 32 for connecting plate 31 and member 27, so as to move plate 31, together with member 27, between a rest position (FIGS. 5a and 5b) in which plate 31 is substantially outside respective gap 22, and a work position (FIGS. 5c and 5d) in which plate 31 is substantially inside respective gap 22.

As shown in FIG. 4, the total thickness of member 27 and plate 31 is approximately equal to but no greater than the diameter of a cigarette 3, and is therefore smaller than the height of respective gap 22.

As shown in FIG. 5, connecting device 32 comprises a tubular guide body 33 extending upwards from plate 31 and coaxial with a hole 34 formed through plate 31; and a pin 35, a head 36 of which normally cooperates, by means of a spring 37, with a free top surface of tubular body 33. When head 36 is positioned contacting the top end of tubular body 33, an end portion 38, opposite head 36, of pin 35 projects beneath plate 31 to engage a hole 39 formed through member 27. Pin 35 is moved in opposition to respective spring 37 by an actuating device 40 comprising two electromagnets 41 and 42, which are energized selectively by a central control unit 43, and are positioned coaxial with pin 35 and facing head 36 when plate 31 is in the work position and the rest position respectively.

Each plate 31 is also provided with a ball locking 23 device 44 for preventing plate 31 from moving accidentally in direction 24 when plate 31 is in the work or rest position. Device 44 comprises two balls 45, each of which—by means of a respective spring 46 parallel to direction 11 and supported by respective guide 23, and when plate 31 is in the rest or work position—selectively engages two respective cavities 47 and 48 formed along a respective longitudinal edge of plate 31.

Operation of forming device 1 will now be described with reference to FIG. 5.

In FIG. 5a, forming device 1 is in the steady operating condition in which intercepting members 30 are set to the rest position and connected to respective push members 27, and each central control unit 43 energizes electromagnet 42 to keep pin 35 raised, in opposition to respective spring 37, and therefore withdrawn from hole 39 in respective push member 27, which, at each step of belt 9, transfers a respective layer 6 of cigarettes 3 into the facing pocket 10 without drawing along intercepting member 30, which is maintained in the rest position by balls 45 engaging respective cavities 47.

When forming device 1 is stopped, the formation of incomplete groups 2, which would be rejected, is avoided by feeding supply device 5 forward a further three steps and, at the same time, successively cutting off, at each further step of device 5, supply of cigarettes 3 to plate 20 of one of groups 16–18 of outlets 15. At the first further step of device 5, intercepting members 30 of outlets 15 in group 16 are moved into the work position; at the second further step of device 5, intercepting members 30 of outlets 15 in group 17 are moved into the work position; and, at the third further step of device 5, intercepting members 30 of outlets 15 in group 16 are moved into the work position.

The movement of each intercepting member 30 from the rest to the work position will now be described with reference to FIGS. 5b–5d.

With reference to FIG. 5b, central control unit 43 deactivates electromagnet 42 to enable respective pin 35, by means of respective spring 37, to engage hole 39 in respective push member 27, at which point (FIG. 5c), intercepting member 30 is moved by actuating cylinder 28, and together with respective push member 27, into the work position.

When intercepting member 30 is in the work position (FIG. 5c), balls 45 of locking device 44 engage cavities 48 in plate 31, and central control unit 43 energizes electromagnet 41 to withdraw pin 35 (FIG. 5d) from respective hole 39, so that, whereas intercepting member 30 is maintained in the work position to cut off supply of cigarettes 3 to respective outlet 15, push member 27 is released from respective intercepting member 30 to enable correct operation of the group of push members 27 which, at each operating cycle, are all moved simultaneously by actuating cylinder 28 between the respective rest and work positions.

When forming device 1 is started up again, intercepting members 30 of outlets 15 in groups 136, 17, 18 are restored to the rest position in the course of three successive steps of device 5, commencing with the intercepting members 30 of group 16, followed by the intercepting members 30 of group 17, and finally, the intercepting members of group 18.

What is claimed is:

1. A forming device for forming groups of cigarettes, each comprising a number of superimposed layers (6) of cigarettes (3), the forming device comprising a hopper (12) for supplying cigarettes (3) and in turn having a number of outlets (15) equally spaced along a supply path (P); a supply device (5) having a number of pockets (10) spaced along said supply path (P) in the same way as said outlets (15) and each for housing a respective said group (2) of cigarettes (3); a movable push member (27) for expelling a respective said layer (6) of cigarettes (3) from a respective said outlet (15) and transferring said layer (6) to a said pocket (10); and an intercepting member (30) movable to and from a work position in which the intercepting member (30) is located beneath a respective said outlet (15); the forming device being characterized in that each intercepting member (30) comprises a rigid plate (31) connectable to the respective movable push member (27) so as to move, with the movable push member (27), to and from said work position.

2. A forming device as claimed in claim 1, characterized by comprising guide means (26, 25) associated with each said outlet (15) to support in sliding manner the respective said intercepting member (30) and the respective said movable push member (27); said intercepting member (30) being mounted to slide between the respective movable push member (27) and the respective outlet (15).

3. A forming device as claimed in claim 1, characterized by comprising, for each said intercepting member (30), a connecting device (32) for connection to the respective movable push member (27).

4. A forming device as claimed in claim 3, characterized in that said connecting device (32) comprises two holes (34, 39) formed respectively through said intercepting member (30) and the associated movable push member (27); pin means (35) movable between an engaged position in which the pin means (35) engage both said holes (34, 39), and a release position in which said pin means (35) engage only one of said holes (34, 39); elastic push means (37) acting on said pin means (35) to keep the pin means (35) in the engaged position; and actuating means (40) for moving said pin means (35) into said release position in opposition to said elastic push means (37).

5. A forming device as claimed in claim 4, characterized in that said actuating means (40) comprise first and a second electromagnet (41, 42), which are aligned with the respective said pin means (35) when the respective intercepting member (30) is in the work position and, respectively, in a rest position in which the intercepting member (30) is located to the side of the respective said outlet (15).

6. A forming device as claimed in claim 5, characterized in that control means (43) are provided to selectively activate said electromagnets (41, 42).

7. A forming device as claimed in claim 1, characterized in that each said intercepting member (30) is provided with a respective locking device (44) for preventing the respective plate (31) from moving accidentally in a direction (24) crosswise to said supply path (P).

* * * * *

UNITED STATES PATENT AND TRADEMARK OFFICE
CERTIFICATE OF CORRECTION

PATENT NO. : 6,269,931 B1
DATED : August 7, 2001
INVENTOR(S) : Fabrizio Tale' et al.

It is certified that error appears in the above-identified patent and that said Letters Patent is hereby corrected as shown below:

Title page,
Item [73], should read -- [73] Assignee: G.D Societa' Per Azioni, Bologna (IT) --

Signed and Sealed this

Twenty-eighth Day of May, 2002

Attest:

JAMES E. ROGAN
Attesting Officer    Director of the United States Patent and Trademark Office